(12) United States Patent
Braga

(10) Patent No.: US 11,900,919 B2
(45) Date of Patent: Feb. 13, 2024

(54) END-TO-END MULTI-SPEAKER AUDIO-VISUAL AUTOMATIC SPEECH RECOGNITION

(71) Applicant: Google LLC, Mountain View, CA (US)

(72) Inventor: Otavio Braga, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/187,292

(22) Filed: Mar. 21, 2023

(65) Prior Publication Data

US 2023/0223012 A1 Jul. 13, 2023

Related U.S. Application Data

(63) Continuation of application No. 17/062,538, filed on Oct. 2, 2020, now Pat. No. 11,615,781.

(Continued)

(51) Int. Cl.
*G10L 15/06* (2013.01)
*G06N 3/08* (2023.01)
(Continued)

(52) U.S. Cl.
CPC ............. *G10L 15/063* (2013.01); *G06N 3/08* (2013.01); *G10L 15/22* (2013.01); *G10L 19/008* (2013.01)

(58) Field of Classification Search
CPC ...... G10L 15/063; G10L 15/22; G10L 19/008
See application file for complete search history.

(56) References Cited

U.S. PATENT DOCUMENTS 10,504,504 B1 * 12/2019 Meltzner ................. G10L 25/27
10,672,387 B2 * 6/2020 Lyon ....................... G10L 19/26
(Continued)

FOREIGN PATENT DOCUMENTS

| CN | 107767865 A | 3/2018 |
| CN | 108596107 A | 9/2018 |

(Continued)

OTHER PUBLICATIONS

USPTO. Office Action relating to U.S. Appl. No. 17/062,538, dated Aug. 9, 2022.

*Primary Examiner* — Mohammad K Islam
(74) *Attorney, Agent, or Firm* — Honigman LLP; Brett A. Krueger; Grant J. Griffith

(57) ABSTRACT

An audio-visual automated speech recognition model for transcribing speech from audio-visual data includes an encoder frontend and a decoder. The encoder includes an attention mechanism configured to receive an audio track of the audio-visual data and a video portion of the audio-visual data. The video portion of the audio-visual data includes a plurality of video face tracks each associated with a face of a respective person. For each video face track of the plurality of video face tracks, the attention mechanism is configured to determine a confidence score indicating a likelihood that the face of the respective person associated with the video face track includes a speaking face of the audio track. The decoder is configured to process the audio track and the video face track of the plurality of video face tracks associated with the highest confidence score to determine a speech recognition result of the audio track.

20 Claims, 5 Drawing Sheets

Related U.S. Application Data

(60) Provisional application No. 62/923,096, filed on Oct. 18, 2019.

(51) Int. Cl.
 *G10L 15/22* (2006.01)
 *G10L 19/008* (2013.01)

(56) References Cited

U.S. PATENT DOCUMENTS

| | | | | |
|---|---|---|---|---|
| 11,705,133 B1* | 7/2023 | Aggarwal | | G10L 17/08 |
| | | | | 704/246 |
| 2011/0224978 A1 | 9/2011 | Sawada | | |
| 2018/0268812 A1 | 9/2018 | Kim et al. | | |
| 2019/0027147 A1 | 1/2019 | Diamant et al. | | |
| 2019/0163982 A1* | 5/2019 | Block | | G06N 5/022 |
| 2020/0035247 A1* | 1/2020 | Boyadjiev | | G06F 21/32 |
| 2020/0065563 A1* | 2/2020 | Zou | | G06N 3/045 |
| 2020/0110864 A1* | 4/2020 | Casado | | G10L 17/04 |
| 2020/0202856 A1* | 6/2020 | Ivanov Bonev | | G06F 3/167 |
| 2020/0219501 A1* | 7/2020 | Cartwright | | G06F 3/0346 |
| 2021/0012769 A1 | 1/2021 | Vasconcelos et al. | | |
| 2021/0065712 A1 | 3/2021 | Holm | | |
| 2021/0082398 A1* | 3/2021 | Hori | | G10L 15/02 |
| 2021/0141863 A1 | 5/2021 | Wu et al. | | |
| 2022/0115020 A1 | 4/2022 | Bradley et al. | | |
| 2022/0253700 A1* | 8/2022 | Sun | | G10L 21/0232 |
| 2022/0358703 A1 | 11/2022 | Chae et al. | | |

FOREIGN PATENT DOCUMENTS

| | | |
|---|---|---|
| CN | 111091824 A | 5/2020 |
| CN | 112639718 A | 4/2021 |
| CN | 113572798 A | 10/2021 |
| CN | 114090986 A | 2/2022 |
| CN | 114356109 A | 4/2022 |
| EP | 3783605 A1 | 2/2021 |

* cited by examiner

END-TO-END MULTI-SPEAKER AUDIO-VISUAL AUTOMATIC SPEECH RECOGNITION

CROSS REFERENCE TO RELATED APPLICATIONS

This U.S. patent application is a continuation of, and claims priority under 35 U.S.C. § 120 from, U.S. patent application Ser. No. 17/062,538, filed on Oct. 2, 2020, which claims priority under 35 U.S.C. § 119(e) to U.S. Provisional Application 62/923,096, filed on Oct. 18, 2019. The disclosures of these prior applications are considered part of the disclosure of this application and are hereby incorporated by reference in their entireties.

TECHNICAL FIELD

This disclosure relates to end-to-end multi-speaker audio-visual automatic speech recognition.

BACKGROUND

Automatic speech recognition (ASR) is an important technology that is used in mobile devices and other devices. In general, automatic speech recognition attempts to provide accurate transcriptions of what a person has said. In noisy environments, or otherwise when audio quality of a recorded utterance is poor, obtaining accurate ASR results can be a difficult task. When video data of a speaker is available, the video data can be leveraged to help improve ASR results. For instance, the video data of the speaker may provide motion of the lips while the speaker is speaking an utterance, which in turn, can be combined with the audio data of the utterance to assist in processing an ASR result.

SUMMARY

One aspect of the disclosure provides a single audio-visual speech recognition (AV-ASR) model for transcribing speech from audio-visual data. The AV-ASR model includes an encoder frontend having an attention mechanism that is configured to receive an audio track of the audio-visual data and a video portion of the audio-visual data. The video portion of the audio-visual data includes a plurality of video face tracks. Each video face track of the plurality of video face tracks is associated with a face of a respective person. For each video face track of the plurality of video face tracks, the attention mechanism is further configured to determine a confidence score indicating a likelihood that the face of the respective person associated with the video face track includes a speaking face of the audio track. The AV-ASR model further includes a decoder configured to process the audio track and the video face track of the plurality of video face tracks associated with the highest confidence score to determine a speech recognition result of the audio track Implementations of the disclosure may include one or more of the following optional features. In some implementations, the single AV-ASR model includes a sequence-to-sequence model. For instance, the AV-ASR model may include an Audio-Visual Recurrent Neural Network Transducer (RNN-T) model. The decoder may be configured to emit the speech recognition result of the audio track in real time to provide a streaming transcription of the audio track. In some examples, the single AV-ASR model does not include a separate face selection system for hard-selecting which video face track of the plurality of video face tracks comprises the speaking face of the audio track.

The attention mechanism may be configured to generate as output an attention-weighted visual feature vector for the plurality of video face tracks. Here, the attention-weighted visual feature vector represents a soft-selection of the video face track of the plurality of video face tracks that includes the face of the respective person with the highest likelihood of including the speaking face of the audio track. Additionally or alternatively, the attention mechanism may include a softmax layer having an inverse temperature parameter configured to cause the attention mechanism to converge to a hard-decision rule of selecting the video face track of the plurality of video face tracks associated with the highest confidence score as the speaking face of the audio track.

In some examples, the encoder frontend is trained on a training data set that includes a training audio track, a first training video face track, and one or more second video face tracks. The training audio track includes one or more spoken utterances and the first training video track includes a correct speaking face of the one or more spoken utterances of the training audio track. Each second training video face track includes an incorrect speaking face of the one or more spoken utterances of the training audio track. In these examples, during training, the attention mechanism is configured to learn how to gate the first training video face track as the correct speaking face of the one or more spoken utterances of the training audio track. Here, the attention mechanism may be trained with cross entropy loss.

Another aspect of the disclosure provides a method for transcribing speech from audio-visual data. The method includes receiving, at an attention mechanism of an encoder frontend of a single audio-visual automated speech recognition (AV-ASR) model, an audio track of the audio-visual data and a video portion of the audio-visual data. The video portion of the audio-visual data includes a plurality of video face tracks and each video face track of the plurality of video face tracks is associated with a face of a respective person. For each video face track of the plurality of video face tracks, the method also includes determining, by the attention mechanism, a confidence score indicating a likelihood that the face of the respective person associated with the video face track comprises a speaking face of the audio track. The method also includes processing, by a decoder of the single AV-ASR model, the audio track and the video face track of the plurality of video face tracks associated with the highest confidence score to determine a speech recognition result of the audio track.

This aspect may include one or more of the following optional features. In some implementations, the single AV-ASR model includes a sequence-to-sequence model. For instance, the AV-ASR model may include an Audio-Visual Recurrent Neural Network Transducer (RNN-T) model. The decoder may be configured to emit the speech recognition result of the audio track in real time to provide a streaming transcription of the audio track. In some examples, the single AV-ASR model does not include a separate face selection system for hard-selecting which video face track of the plurality of video face tracks comprises the speaking face of the audio track.

In some examples, determining the confidence score for each video face track of the plurality of video face tracks includes generating an attention-weighted visual feature vector for the plurality of video face tracks. Here, the attention-weighted visual feature vector represents a soft-selection of the video face track of the plurality of video face tracks that includes the face of the respective person with the highest likelihood of comprising the speaking face of the audio track. Additionally or alternatively, the attention mechanism may include a softmax layer having an inverse temperature parameter configured to cause the attention mechanism to converge to a hard-decision rule of selecting the video face track of the plurality of video face tracks associated with the highest confidence score as the speaking face of the audio track.

In some implementations, the method also includes training the encoder frontend on a training data set that includes a training audio track, a first training video face track, and one or more second video face tracks. The training audio track includes one or more spoken utterances and the first training video track includes a correct speaking face of the one or more spoken utterances of the training audio track. Each second training video face track includes an incorrect speaking face of the one or more spoken utterances of the training audio track. In these examples, training the encoder front end includes training the attention mechanism to learn how to gate the first training video face track as the correct speaking face of the one or more spoken utterances of the training audio track. Here, the attention mechanism may be trained with cross entropy loss The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
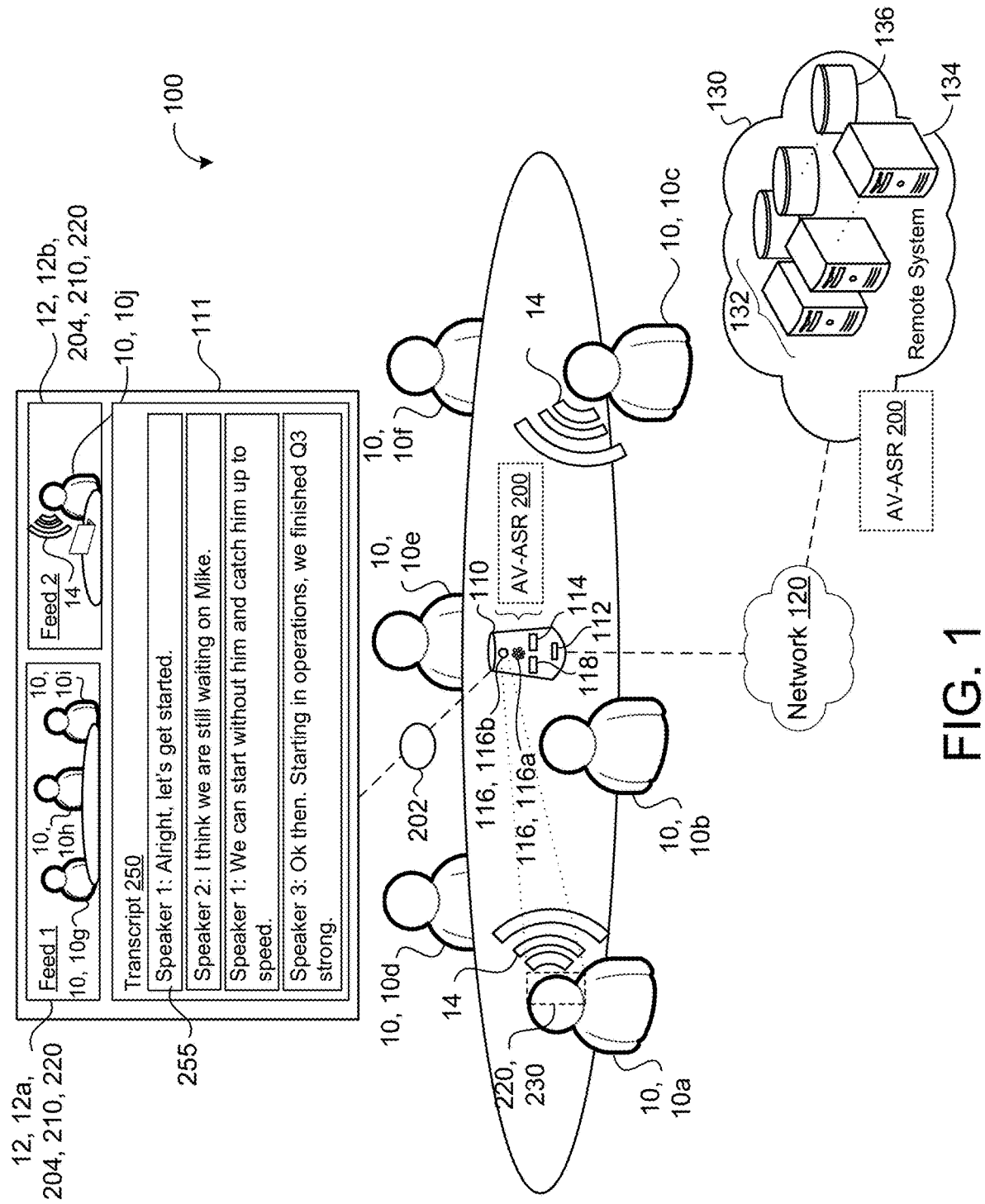
FIG. 1 is a schematic view of an example multi-speaker environment including a single audio-visual automated speech recognition model for transcribing speech from audio-visual data.

Audio-visual (A/V) automated speech recognition (ASR) is able to make conventional ASR more robust by leveraging video data of a face of a speaker in addition to audio data of a spoken from the speaker. In a realistic setting, one has to decide at each point in time which face to designate as a speaking face to an audio track when there are multiple faces in an image. A conventional pipeline for A/V ASR includes a sequence of systems/models that include a face tracking module, an active speaker selection model, and an A/V ASR model. The face tracking module detects and tracks faces in audio-video data and the active speaker selection model selects a speaking face for each portion of audio and passes a face track of the selected speaking face and corresponding audio track to the A/V ASR model. The A/V ASR model uses the audio track and face track selected by the active speaker selection model to output speech recognition hypotheses (e.g., predicted transcriptions) for segments of the audio-video data.

Conventionally, the active speaker selection model and the A/V ASR model are separate models trained separately and independently from one another. That is, the A/V ASR model is traditionally trained with a single face track that is assumed to be the speaking face selected for a given portion of an audio track. With this traditional approach, performance (e.g., accuracy of transcriptions) of the A/V ASR model hinges on the ability of the separate active speaker selection model to accurately select the correct speaking face in the audio-video data. Otherwise, selection of the wrong speaking face by the active speaker selection model will result in a degradation of performance by the A/V ASR model.

Implementations herein are directed toward training a single A/V ASR model end-to-end (E2E) on video data with multiple face tracks and an audio track simultaneously so that the A/V ASR model learns how to gate a correct face track for each segment of the audio track to aid in speech recognition. Accordingly, by training the single A/V ASR model to operate on multiple face tracks, implementations herein discard the need for a separate active speaker selection model that is tasked with tracking multiple faces and detecting the correct speaking face passed as a single face track to the A/V ASR model. Simply put, for multi-speaker A/V ASR tasks, the single A/V ASR model is configured to receive audio-visual inputs with multiple face tracks and an audio track, employ an attention layer at an encoder front end to soft-select an appropriate face track as a speaking face for each portion of the audio track to assist a decoder portion in determining a speech recognition result for each portion of the audio track.

As opposed to relying on separately trained active speaker selection and A/V ASR models that each rely on separate visual frontends that potentially perform similar roles, training the single A/V ASR model to handle multiple face video tracks increases computational performance by eliminating the redundancy associated with the similar tasks performed by separate visual frontends. Moreover, the E2E nature of the single A/V ASR model simplifies coordination between subsystems since the only input to the A/V ASR model is an output from a face tracker module which is a common component in standard computer vision. As will become apparent, the single A/V ASR model also provides more robust speech recognition on multi-speaker ASR tasks since an early hard decision is not required for selecting an active face track as is the case for the conventional techniques using the separate active face selection model. Instead, the single A/V ASR model uses an attention mechanism to soft-select the active face track (i.e., the face track associational with an active speaking face), thereby permitting remaining portions of the A/V ASR model to naturally adapt even when a high probability is assigned to the wrong face track. The use of the separate active speaker selection model to select the correct active face track is also sensitive to dynamics of discrete speaker changes over time which are difficult to emulate during training.

Figure 2:
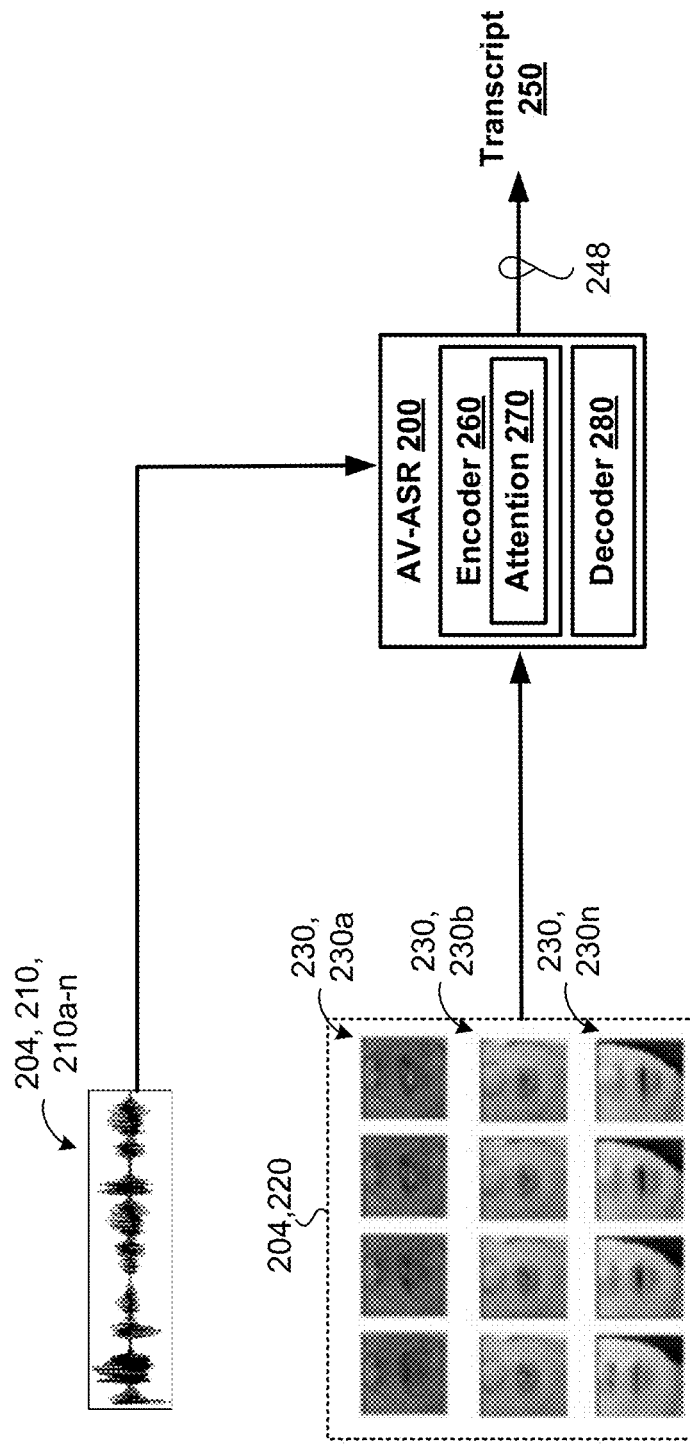
FIG. 2 is a schematic view of an example of the single audio-visual automated speech recognition model of FIG. 1.

Referring to FIG. 1, in some implementations, an environment 100 includes a plurality of participants 10, 10a-j attending a meeting (e.g., a video conference). Here, the environment 100 is a host meeting room with six participants 10a-f attending the meeting (e.g., a video conference) in the host meeting room. The environment 100 includes a user device 110 that receives one or more content feeds 12 (also referred to as a multi-media feed, a content stream, or a feed) via a network 120 from a remote system 130. In the example shown, the user device 110 receives two feeds 12a, 12a each corresponding to a different remote meeting room. Here, the first feed 12a includes three participants 10, 10g-i participating in the meeting from a remote New York office and the second feed includes a single participant 10, 10j participating from a remotely located residence of the participant 10j. Each content feed 12 may correspond to audio-visual data 204 including an audio portion 210 corresponding to an audio track and a video portion 220 including one or more video face tracks 230 (FIG. 2). As used herein, the terms "audio track" and "audio portion" may be used interchangeably. The video portion 220 may be associated with image data such as video content, video signal, or video stream. The user device 110 includes, or is in communication with, a display 111 configured to display the video portion 220 of the audio-visual data 204. The user device 110 also includes, or is in communication with, an audio speaker 112 configured to audibly output the audio portion 210 of the audio-visual data 204.

In addition to receiving audio-visual data 204 from the remote meeting rooms via respective content feeds 12, the user device 110 includes, or is in communication with, one or more peripherals 116 for capturing audio-visual data 204 from the host meeting room. For instance, an audio capture device 116, 116a (e.g., an array of one or more microphones) is configured to capture utterances 14 spoken by the participants 10a-g and convert the captured utterances 14 into audio data that corresponds to the audio portion 210 of the audio-visual data 204. On the other hand, an image capture device 116, 116b (e.g., one or more cameras) is configured to capture image data that corresponds to the video portion 220 of the audio-visual data 204. Here, the video portion 220 includes video face tracks 230 each associated with a face of a respective one of the participants 10a-g. In some configurations, the image capturing device 116b is configured to capture 360-degrees about the user device 110 to capture a full view of the environment 100. For instance, the image capturing device 116b includes an array of cameras configured to capture the 360-degree view.

The remote system 130 may be a distributed system (e.g., cloud computing environment or storage abstraction) having scalable/elastic resources 132. The resources 132 include computing resources 134 (e.g., data processing hardware) and/or storage resources 136 (e.g. memory hardware). In some implementations, the remote system 130 hosts software that coordinates the environment 100 (e.g., on the computing resources 132). For instance, the computing resources 132 of the remote system 130 execute software, such as a real-time communication application or a specialty meeting platform. In some examples, a face tracker module executes on the data processing hardware 114 to detect the video face tracks 230 in the video portion 220 of the audio-visual data 204.

In the example shown, the user device 110 includes data processing hardware 114 and memory hardware 118 in communication with the data processing hardware 114 and storing instructions that when executed on the data processing hardware 114 cause the data processing hardware 114 to perform operations. In some examples, a face tracker module executes on the data processing hardware 114 to detect the video face tracks 230 in the video portion 220 of the audio-visual data 204. Some examples of a user device 110 include a video conference computing device, a computer, a laptop, a mobile computing device, a television, a monitor, a smart device (e.g., smart speaker, smart display, smart appliance), a wearable device, etc.

With continued reference to FIG. 1, an audio-visual automated speech recognition (AV-ASR) model 200 processes the audio-visual data 204 to generate a transcription 250 from the audio track 210 of the audio-visual data 204. Notably, and described in greater detail below with reference to FIG. 2, the AV-ASR model 200 includes a single end-to-end model that receives both the audio track 210 and a plurality of video face tracks 230 detected in the video portion 220 of the audio-visual data 204, and determines which one of the video face tracks 230 includes a highest likelihood of including an active speaking face of the audio track 210. The AV-ASR model 200 than uses the video face track 230 that is most likely to include the active speaking face of the audio track 204 to aid in transcribing speech from the audio track 210. As such, the use of the video portion 220 increases the accuracy of the transcription 250 of the audio track 210 since the video face track 230 provides the AV-ASR model 200 with visual features (e.g., facial features/lips). In some particular examples, using only audio for speech recognition is difficult when the audio is associated speakers with speech disabilities. The video portion may improve the accuracy of speech recognition using techniques of correlating lip motion from a user with a particular speech disorder in unison with the audio data.

The display 111 associated with the user device 110 may display the transcription 250 generated by the AV-ASR model 200. The AV-ASR model 200 may stream the transcription 250 in real time for output on the display 111 and/or on displays associated with remotely located participants 10h-j, 10k. Additionally or alternatively, the transcription 250 may be saved on memory hardware 118, 136 and retrieved at a later time for viewing. The AV-ASR model 200 may execute on the data processing hardware 114 of the user device 110, thereby enabling the user device 110 to perform on-device speech recognition without the need to perform speech recognition on a server (e.g., remote system 130). On-device speech recognition alleviates the requirement of establishing a network connection with a server, incurring latency due to bandwidth constraints, and also preserve data that a user may not want to share with the server. Moreover, executing the AV-ASR model 200 on the user device 110 may permit the use of higher fidelity audio-visual data 204 since neither one of the audio portion 210 or the video portion 220 would need to be compressed to satisfy network bandwidth constraints, as may be required if the data 204 were sent to a server for processing.

The AV-ASR model 200 may also execute on the data processing hardware 134 of the remote system 130. For instance, the data processing hardware 134 of the remote system 130 may execute instructions stored on the memory hardware 136 of the remote system 130 for executing the AV-ASR model 200. Here, the AV-ASR model 200 may process the multi-speaker audio-visual data 204 to generate the transcription 250 as discussed above. The remote system 130 may transmit the transcription 250 over the network 120 to the user device 110 for display on the display 111. The remote system 134 may similarly transmit the transcription 150 to computing devices/display devices associated with the participants 10g-i corresponding to the first feed 12a and/or the participant 10j corresponding to the second feed 12b.

The data processing hardware 134 of the remote system 130 may provide increased processing capabilities not achievable on client devices and is not limited to memory constraints, thereby enabling the use of larger models with more parameters for increased accuracy. In some examples, some portions of the AV-ASR model 200 execute on the user device 110 while other portions of the AV-ASR model 200 execute on the remote system (e.g., server) 130.

FIG. 2 provides an example of the end-to-end, single AV-ASR model 200 of FIG. 1 that is configured to receive audio-visual data 204 including an audio track 210 and a video portion 204 with multiple face tracks 230, 230a-c to determine a speech recognition result 248 of the audio track 210. While the example environment 100 of FIG. 1 depicts the audio-visual data 204 originating from a video conference scenario, a single feed of audio-visual data 204 may arrive from any source. For instance, the AV-ASR 200 may receive a single feed of audio-visual data 204 from media content such as a movie or a live television broadcast. In this scenario, the AV-ASR model 200 may similarly use the video portion 220 of the audio-visual data 204 to aid in determining speech recognition results 248 of the audio track 210, and thus provide a transcription 250 of speech in the audio track 210 that may be provided as close captioning on a display (e.g., a television screen).

Each video face track 230 is associated with a face of a respective person 10. While the AV-ASR model 200 is shown in the example as receiving three video face tracks 230a-c, the number of video face tracks 230 the AV-ASR model 200 receives and subsequently processes is non-limiting. Thus, the AV-ASR model 200 may receive less than three video face tracks 230 or more than three video face tracks in other examples. Notably, the single AV-ASR model 200 does not include a separate face selection system for hard-selecting which video face track 230 of the plurality of video face tracks includes a speaking face of the audio track.

The AV-ASR model 200 includes an encoder portion ("encoder") 260 and a decoder portion ("decoder") 280. The AV-ASR model 200 may include a sequence-to-sequence model. In some examples, the AV-ASR model 200 includes an Audio-Visual Recurrent Neural Network-Transducer (RNN-T) model. The Audio-Visual RNN-T may include a stack of five bidirectional long short-term memory (BiLSTM) layers of 512 units using layer normalization for the encoder 260 and two LSTM layers of 2,048 units with character tokens for the decoder 280.

The encoder 260 is associated with an encoder frontend that includes an attention mechanism 270. The attention mechanism 270 may be associated with an attention layer in the encoder portion 260 of the neural network model 200. The encoder is configured to receive the audio track 210 of the audio-visual data 204 and the video portion 220 of the audio-visual data 204 that includes the plurality of video face tracks 230, 230a-c. The audio track 210 may be segmented into 25 millisecond (ms) audio frames with steps of 10 ms between consecutive audio frames. Mel-spectral energies, such as 80 mel filter bank channels, may be computed for each audio frame to compress its range with a log function, and thereafter, folding every three consecutive feature vectors together to yield 240-dimensional acoustic feature vectors 210a-n every 30 ms. Accordingly, the encoder portion receives and processes the acoustic feature vectors 210a-n derived from the audio track 210.

For each video face track 230, the attention mechanism 270 determines a corresponding confidence score indicating a likelihood that the face of the respective person associated with the corresponding video face track 230 includes a speaking face of the audio track 210. In some implementations, the attention mechanism 270 includes a softmax layer having an inverse temperature parameter configured to cause the attention mechanism 270 to converge to a hard-decision rule of selecting the video face track 230 of the plurality of video face tracks 230a-c associated with the highest confidence score as the speaking face of the audio track 110. The decoder portion 280 of the AV-ASR model 200 is configured to process the audio track 210 and the video track 230 of the plurality of video face tracks 230a-c with the highest confidence score to determine the speech recognition result 248 of the audio track 210.

In some examples, the attention mechanism 270 represents the confidence associated with each video face track 230 as a corresponding attention weight applied to a visual feature vector associated with the corresponding video face track 230. As such, the attention mechanism 270 may output an attention-weighted visual feature vector 272 for the plurality of video face tracks 230 that soft-selects the video face track 230 that is most likely to include the active speaking face of a corresponding synchronized segment (e.g., acoustic feature vector) of the audio track 210.

In some implementations, the encoder 260 concatenates the attention-weighted visual feature vector 272 that soft-selects the video face track 230 associated with the active speaking face with the acoustic feature vector to provide a corresponding combined feature vector at each time step. The combined feature vector at each time step indicates an encoding of the audio track 210 and the video face track 230 among the plurality of video face tracks that is associated with the highest confidence score. Accordingly, at each time step, the decoder portion 280 is configured to decode the combined feature vector to determine a corresponding speech recognition result 248 of the audio track 210. The speech recognition result 248 at each time step may include a probability distribution over possible recognition results. In examples when the AV-ASR model 200 is the Audio-Visual RNN-T model, the model 200 may emit the speech recognition result 248 at each time step in a streaming fashion. A speech recognition result may include a character, a space, a word-piece, or a word. The multiple speech recognition results 248 may combine to provide the transcription 250 of the audio track 210. Thus, the Audio-Visual RNN-T model is capable of streaming a transcription 250 of the audio track 210 in real time. In some examples, the audio track 210 includes speech spoken in a first language and the decoder 280 is configured to determine a corresponding speech recognition 248 in a second language as a translation of the speech spoken in the first language.

In some examples, the AV-ASR 200 model is further configured provide speaker labels 255 to the transcription 250 to identify a source of the transcribed content. For instance, labeling a speaker of the transcribed content may be referred to as speaker diarization to answer both "who spoke what" and "who spoke when". Accordingly, by leveraging the video portion 220 of the audio-visual data 204, the AV-ASR model 200 may provide diarization results that include a corresponding speaker label 255 assigned to each segment of the transcription 250 to identify "who spoke what" and "who spoke when".

Figure 3:
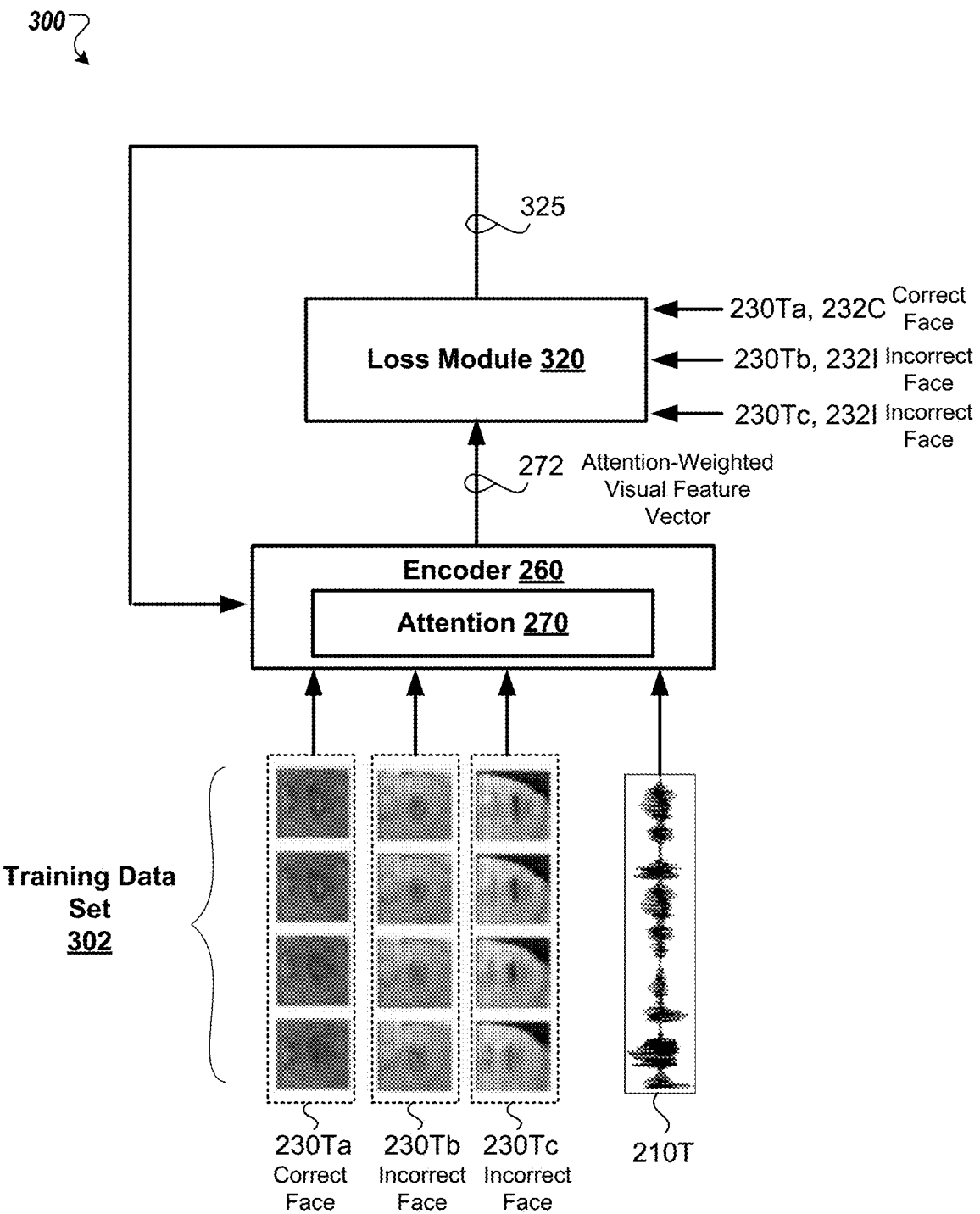
FIG. 3 is schematic view of an example training process for training an encoder frontend of the single audio-visual automated speech recognition model of FIG. 1.

FIG. 3 shows an example training process 300 for training the encoder portion 260 of the AV-ASR model 200 to learn how to gate a correct video face track 230 for each segment of the audio track to aid in speech recognition. The encoder portion 260 is trained on a training data set 302 that includes a training audio track 210T, a first training video face track 230Ta, and one or more second training video face tracks 230Tb. The training audio track 210 includes one or more spoken utterances. The first training video face track 230Ta includes a correct speaking face of the one or more spoken utterances of the training audio track 210T. The first raining video face track 230Ta is paired with a ground-truth correct face label 232C. Each second training video face track 230Tb includes an incorrect speaking face of the one or more spoken utterances of the audio track 210. Each second training video face track 230Tb is paired with a ground-truth incorrect face label 232I.

At each of a plurality of time steps during the training process 300, the encoder portion 260 receives, as input, the training audio track 210T, the first training video face track 230Ta, and the one or more second training video face tracks 230Tb, and generates/predicts as output via the attention mechanism 270, an attention-weighted visual feature vector 272 that corresponds to a soft-selection of the video face track 230Ta, 230Tb that is most likely to include the active speaking face of the audio track 210 at the time step. In lieu computing the attention-weighted visual feature vector 272, the encoder portion 210 may output a predicted probability distribution over possible training video face tracks 230T that include the correct speaking face of the audio track 210.

The attention-weighted visual feature vector 272 (or probability distribution) is fed to a loss module 320 for determining a loss term 325 (i.e., a loss function) indicating the accuracy of the attention mechanism 270 in soft-selecting the first training video face track 230Ta as including the correct speaking face of the audio track 210. Accordingly, the loss module 320 is a supervised loss term module that receives the correct speaking face label 232C paired with the first training video face track 210Ta and the incorrect speaking label 232I paired with each second training video face track 210Tb as ground-truth. The loss term 325 indicates cross entropy loss of the attention mechanism and is fed back to the attention mechanism 270 for teaching the attention mechanism 270 to learn how to gate the first training video face track 230Ta as the correct speaking face of the one or more spoken utterances of the training audio track 210. Thus, the loss term 325 trains the attention mechanism 270 with gradient-decent cross entropy loss by updating parameters of the attention mechanism 270.

Figure 4:
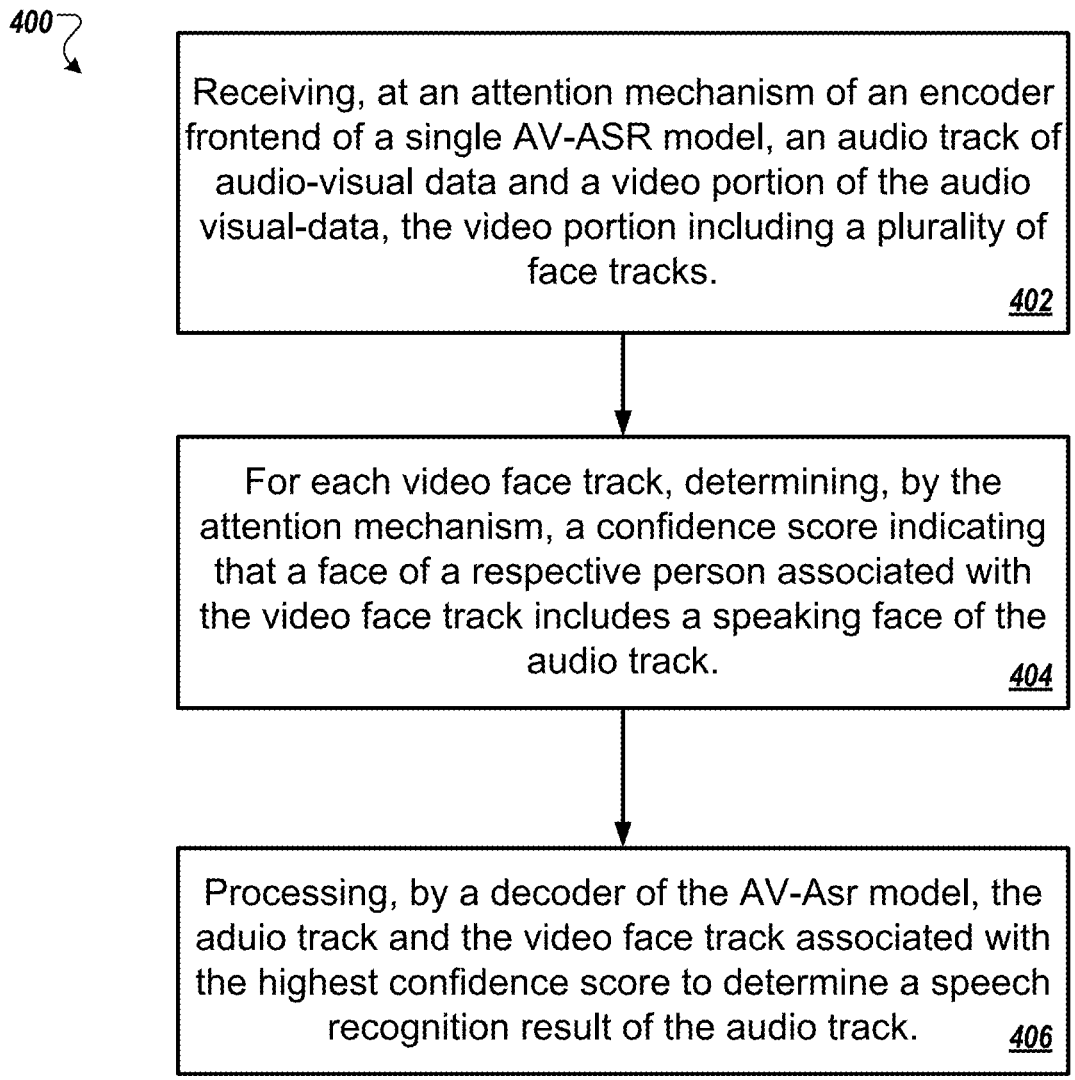
FIG. 4 is an example arrangement of operations for a method of transcribing speech from audio-visual data.

FIG. 4 provides a flowchart of an example arrangement of operations for a method 400 of using a single audio-visual automates speech recognition (AV-ASR) model 200 to transcribe speech 14 from audio-visual data 204. The single AV-ASR model 200 and the operations for the method 400 may execute on the data processing hardware 114 of the user device 110 of FIG. 1, the data processing hardware 134 of the remote system (e.g., distributed system) 130 of FIG. 1, or a combination thereof.

At operation 402, the method 400 includes receiving, at an attention mechanism 470 of an encoder frontend 460 of the single AV-ASR model 200, an audio track 210 of the audio-visual data 402 and a video portion 220 of the audio-visual data 402. The video portion 220 includes a plurality of video face tracks 230. Each video face track 230 of the plurality of video face tracks 230 is associated with a face of a respective person.

At operation 404, for each video face track 230 of the plurality of video face tracks 230, the method 400 also includes determining, by the attention mechanism 270, a confidence score indicating a likelihood that the face of the respective person associated with the video face track 230 includes a speaking face of the audio track 210. Here, determining the confidence score for each video face track 230 of the plurality of video face tracks 230 may include the attention mechanism 270 generating an attention-weighted visual feature vector 272 for the plurality of video face tracks 230. The attention-weighted visual feature vector 270 may represent a soft-selection of the video face track 230 of the plurality of video face tracks 230 that includes the face of the respective person with the highest likelihood of including the speaking face of the audio track 210. In some examples, the attention mechanism 270 includes a softmax layer having an inverse temperature parameter configured to cause the attention mechanism 270 to converge to a hard-decision rule of selecting the video face track 230 of the plurality of video face tracks 230 associated with the highest confidence score as the speaking face of the audio track 210.

At operation 406, the method 400 includes processing, by a decoder 280 of the single AV-ASR model 200, the audio track 210 and the video face track 230 of the plurality of video face tracks 230 associated with the highest confidence score to determine a speech recognition result 248 of the audio track 210. In some examples, the decoder 280 is configured to emit the speech recognition result 248 of the audio track 210 in real time to provide a streaming transcription 250 of the audio track 210.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

Figure 5:
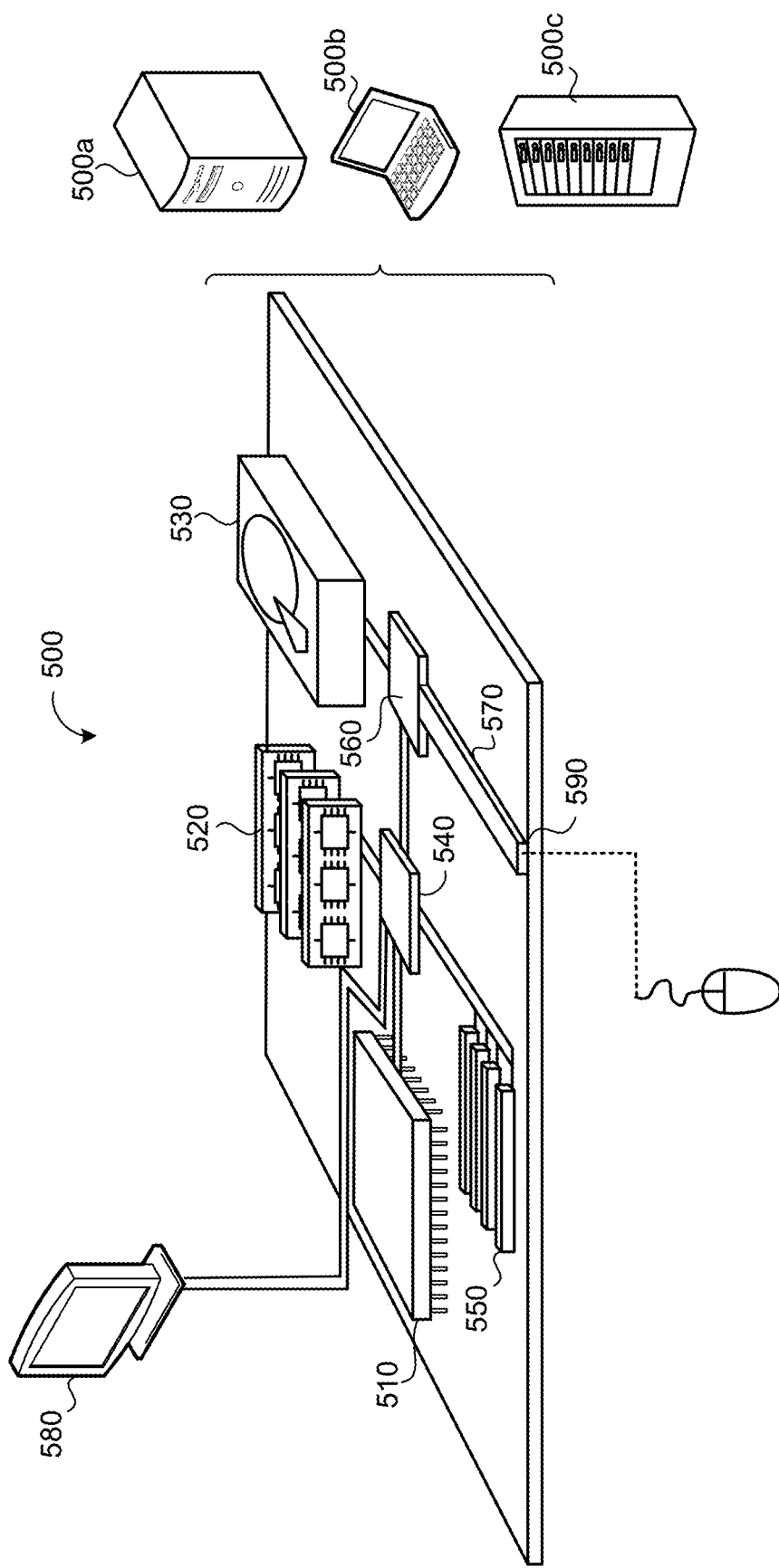
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface

540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500*a* or multiple times in a group of such servers 500*a*, as a laptop computer 500*b*, or as part of a rack server system 500*c*.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. An audio-visual automated speech recognition (AV-ASR) model for transcribing speech from audio-visual data, the AV-ASR model comprising:
an encoder configured to:
receive a sequence of acoustic feature vectors for an audio track and a plurality of video face tracks, each video face track of the plurality of video face tracks is associated with a face of a respective person; and
for each corresponding acoustic feature vector in the sequence of acoustic feature vectors:
determine a respective attention-weighted visual feature vector that soft-selects a particular one of the video face tracks that is most likely to include the face of the respective person as a speaking face of the corresponding acoustic feature vector; and
generate a combined feature vector by concatenating the respective attention-weighted visual feature vector with the corresponding acoustic feature vector; and
a decoder configured to process the combined feature vector generated for each corresponding acoustic feature vector in the sequence of acoustic feature vectors to determine a speech recognition result of the audio track.

2. The AV-ASR model of claim 1, wherein the AV-ASR model comprises a sequence-to-sequence model.

3. The AV-ASR model of claim 1, wherein the AV-ASR model comprises an Audio-Visual Recurrent Neural Network Transducer (RNN-T) model.

4. The AV-ASR model of claim 1, wherein the AV-ASR model does not include a separate face selection system for hard-selecting which video face track of the plurality of video face tracks comprises the speaking face of the audio track.

5. The AV-ASR mode of claim 1, wherein the encoder is further configured to, for each particular video face track of the plurality of video face tracks, determine a respective confidence score indicating a respective likelihood that the face of the respective person associated with the particular video face track comprises a speaking face of the corresponding acoustic feature vector.

6. The AV-ASR model of claim 5, wherein the encoder comprises a softmax layer having an inverse temperature parameter configured to converge to a hard-decision rule of selecting the video face track of the plurality of video face tracks associated with the highest confidence score as the speaking face of each corresponding audio feature vector.

7. The AV-ASR model of claim 1, wherein the encoder is trained on a training data set comprising:
a training audio track comprising one or more spoken utterances;
a first training video face track comprising a correct speaking face of the one or more spoken utterances of the training audio track; and
one or more second training video face tracks, each second training video face track comprising an incorrect speaking face of the one or more spoken utterances of the training audio track.

8. The AV-ASR model of claim 7, wherein, during training, the encoder is configured to learn how to gate the first training video face track as the correct speaking face of the one or more spoken utterances of the training audio track.

9. The AV-ASR model of claim 7, wherein the encoder is trained with cross entropy loss.

10. The AV-ASR model of claim 1, wherein the decoder is configured to emit the speech recognition result of the audio track in real time to provide a streaming transcription of the audio track.

11. A computer-implemented method executed on data processing hardware that causes the data processing hardware to perform operations comprising:
receiving a sequence of acoustic feature vectors for an audio track and a plurality of video face tracks, each video face track of the plurality of video face tracks is associated with a face of a respective person;
for each corresponding acoustic feature vector in the sequence of acoustic feature vectors:
determining, using an encoder of an audio-visual automated speech recognition (AV-ASR) model a respective attention-weighted visual feature vector that soft-selects a particular one of the video face tracks that is most likely to include the face of the respective person as a speaking face of the corresponding acoustic feature vector; and
generating, using the encoder, a combined feature vector by concatenating the respective attention-weighted visual feature vector with the corresponding acoustic feature vector;
processing, using a decoder of the AV-ASR model, the combined feature vector generated for each corresponding acoustic feature vector in the sequence of acoustic feature vectors to determine a speech recognition result of the audio track.

12. The computer-implemented method of claim 11, wherein the AV-ASR model comprises a sequence-to-sequence model.

13. The computer-implemented method of claim 11, wherein the AV-ASR model comprises an Audio-Visual Recurrent Neural Network Transducer (RNN-T) model.

14. The computer-implemented method of claim 11, wherein the AV-ASR model does not include a separate face selection system for hard-selecting which video face track of the plurality of video face tracks comprises the speaking face of the audio track.

15. The computer-implemented method of claim 11, wherein the operations further comprise, for each particular video face track of the plurality of video face tracks, determining, using the encoder, a respective confidence score indicating a respective likelihood that the face of the respective person associated with the particular video face track comprises a speaking face of the corresponding acoustic feature vector.

16. The computer-implemented method of claim 15, wherein the encoder comprises a softmax layer having an inverse temperature parameter configured to converge to a hard-decision rule of selecting the video face track of the plurality of video face tracks associated with the highest confidence score as the speaking face of each corresponding audio feature vector.

17. The computer-implemented method of claim 11, wherein the encoder is trained on a training data set comprising:
- a training audio track comprising one or more spoken utterances;
- a first training video face track comprising a correct speaking face of the one or more spoken utterances of the training audio track; and
- one or more second training video face tracks, each second training video face track comprising an incorrect speaking face of the one or more spoken utterances of the training audio track.

18. The computer-implemented method of claim 17, wherein, during training, the encoder is configured to learn how to gate the first training video face track as the correct speaking face of the one or more spoken utterances of the training audio track.

19. The computer-implemented method of claim 17, wherein the encoder is trained with cross entropy loss.

20. The computer-implemented method of claim 11, wherein the operations further comprise emitting, using the decoder, the speech recognition result of the audio track in real time to provide a streaming transcription of the audio track.

* * * * *